July 6, 1954 — H. WAGNER — 2,682,782
STEERING GEAR FOR MOTOR VEHICLES
Filed Sept. 17, 1952
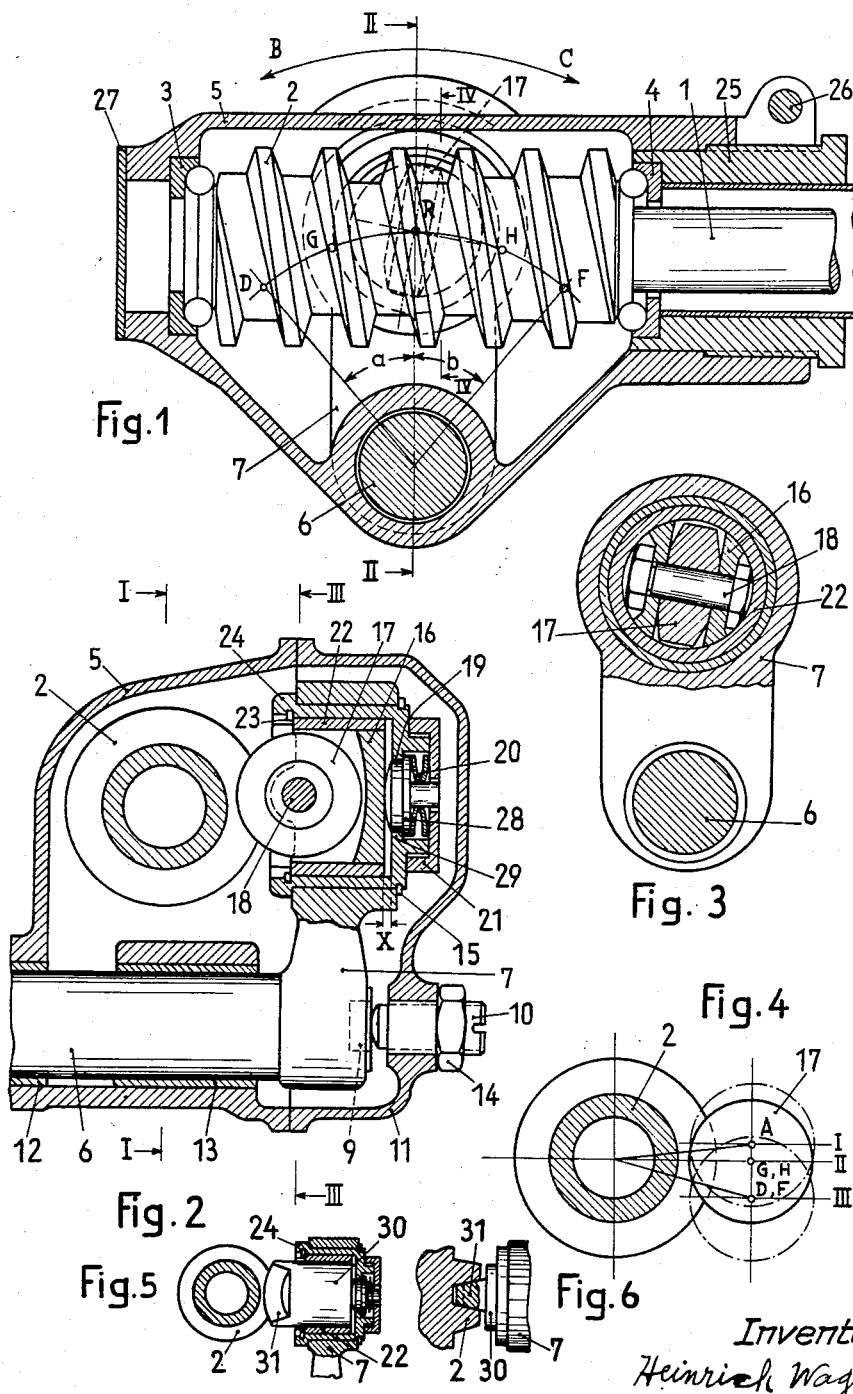
Inventor:
Heinrich Wagner
By Eyre, Mann & Burrows
Attorneys Patented July 6, 1954

2,682,782

UNITED STATES PATENT OFFICE 2,682,782

STEERING GEAR FOR MOTOR VEHICLES

Heinrich Wagner, Schwabisch-Gmund, Germany, assignor to Zahnradfabrik Friedrichshafen, Aktiengesellschaft, Friedrichshafen, Bodensee, Germany Application September 17, 1952, Serial No. 310,105

11 Claims. (Cl. 74—500)

1

This invention relates to improvements in steering gears for motor vehicles of the kind having a steering worm and an engaging body.

In accordance with the present invention, the engaging body cooperating with the steering worm is rockable about an axis parallel to the axis of the steering arm. The engaging body may also be constructed as a roller which is mounted to rotate about an axis situated transversely to the steering arm axis. Both the engaging body and the roller may be provided with a profile adapted to the steering worm such that over the entire arcuate movement path of the steering arm head a uniform linear profile contact is ensured.

In the steering of vehicles this automatic and exact adaptation of the engaging body or roller to the thread profile of the steering worm in all positions within the arc of movement of the steering arm is advantageous inasmuch as the forces impinging on the steering gear are taken by a surface formed by the linear contact between the engaging body and the worm thread flank, while the specific area pressure remains within permissible limits. This advantageous working effect could hitherto not be achieved with known steering gears in which there was often only spot contact between the engaging body and the worm thread. The steering gear constructed in accordance with the invention is, in consequence of its perfect mode of operation, equivalent to a steering gear construction having a round finger engaging in the worm. In addition however, the advantage is gained that any inaccuracies that may occur in the worm threads, which are always difficult to produce, no longer have a disturbing influence.

Another advantageous development of the steering gear consists in close connection with the arrangement of the engaging body or roller also in the shaping of the steering worm, since the thread of the steering worm has different thread depths in the course of the screw thread or threads while the effective flank profile remains the same, in order thereby to obtain an adaptation of the thread of the worm to the different positions of the engaging body in relation to the steering worm resulting from the movement of the steering arm through the steering arc. The steering worm may, in addition, be so constructed that the thread, while having a uniform effective flank profile has a differing pitch.

In order that the invention may be more readily understood, reference is made to the accompanying drawings which illustrate diagrammatically

2 and by way of example, one embodiment of steering gear in accordance therewith, and in which:

Figure 1 is a longitudinal section through the steering gear on the line I—I of Figure 2;

Figure 2 is a section on the line II—II of Fig. 1;

Figure 3 is a section on the line III—III of Fig. 2;

Figure 4 shows the steering worm in cross-section on the line IV—IV of Fig. 1 and also the engaging roller in different positions.

Figure 5 shows the steering worm in cross-section and also a tooth-shaped engaging body.

Figure 6 is a plan view of the parts shown in Fig. 5.

1 is a steering spindle on which is fastened or carried a steering worm 2 which rests in bearings 3 and 4 in a housing 5. A steering arm 7 is connected to an axle 6 which is mounted in bushes 12 and 13 in the housing 5. An adjusting screw 10 mounted in the housing cover 11 bears against an abutment 9 in the steering arm 7 and can be secured in any position by means of a nut 14. An engaging roller 17, which operatively engages the steering worm 2, is mounted in a holder 16, namely running loosely on a bolt 18 which is secured in the holder 16 by means of a head and nut. The holder 16 is firmly embraced by a hollow cylindrical jacket 22 of wear-resistant material and is rotatably and axially slidably accommodated together with said jacket in a bearing bush 24. The bearing bush 24 is secured in the head of the steering arm 7 by an expanding ring 15. At the front (i. e. the left of Fig. 2) the position of the jacket 22 and holder 16 is limited by an expanding ring 23. At the back, however, both parts 22 and 16 can yield within a clearance designated by $x$, namely against the action of a spring 20 on a pin 19 bearing against the holder 16. A shoulder 29 provided in the bush 24 forms the movement limit for the pin 19. The latter has a collar 28 for bearing against the shoulder 29. A nut 21 screwed on to the end of the bush 24 serves to support the spring 20.

In order to ensure correct installation of the steering worm 2 in the housing 5, an adjusting nut 25 is provided which can be secured by means of a locking screw 26. At the opposite end of the housing there is a closure cover 27.

The mode of operation of the steering gear according to the invention is as follows:

The engaging roller 17 which is free to rotate about a line in a plane parallel to the axis of the steering spindle engages with an exact profile contact in the screw thread of the steering worm. If the steering worm is turned, the centre and apex point A of the engaging roller 17 travels in the direction of the arc lines B or C along the steering worm to the end points D or F, the steering arm 17 being rocked through the angles $a$ or $b$. In this deflection movement of the steering arm 7 the engaging roller 17 is adjusted by lateral tipping to the position at the given moment in the screw thread of the worm by virtue of the turning of the holder 16, 22 in the steering arm 7. Adjustment of the profiled engaging roller 17 to the thread flanks of the steering worm 2 is effected entirely automatically and by a constrained motion.

When the steering arm 7 and with it the engaging roller 17 describes its path along the worm 2, the position of engagement changes in relation to the middle plane which runs at right-angles and transversely to the longitudinal axis of the worm. At the two intersection points G, H the middle of the engaging roller 17 is located exactly in the longitudinal middle plane of the steering worm 2. As far as the two end points D and F, which lie beneath the intersection points G and H and the apex point A, which lies above the intersection points G and H, the engaging roller 17 moves away from the worm axis. In this respect there is an adaptation of the changed position of the engagement roller 17 in relation to the screw thread in the worm 2 at the points A, D, F, in such manner that in the screw thread in the worm a depth correction is effected corresponding to the depth variations of engaging roller 17, beginning at the intersection points G and H and rising in the shape of a parabola to the maximum limit at the points A, D and F. The reduction of the thread depth caused by the correction entails a narrowing of the thread width, namely to such an extent that the engaging roller 17 can move in the desired manner in every position in a worm thread without play and without jamming. In every case the worm axis lies exactly in the middle of the path surface covered by the engaging roller 17 and limited and surrounded by the points A, D, F.

The holder 16 is supported by the pin 19 at the side opposite to the point of engagement of the engaging roller 17 in that of the worm 2. The collar 23 of the pin 19 is pressed against the shoulder 29 of the bearing bush 19 under the influence of the stressed plate springs 20, so that the engaging roller 17 in the position of rest and when the steering gear is stressed normally is not under the influence of the potential energy stored in the plate springs. Said energy becomes effective only when excessive shocks occurring during travelling act on the steering arm 7. In such moments of danger the engaging roller 17 can yield by the amount $x$, overcoming the force stored in the springs, whereby the jarring blows on the thread of the worm 2, which may be considerable, are reduced and rendered harmless.

Instead of the roller 17 an engaging body may be provided constituted by a tooth somewhat in the shape of a segment-shaped cut-out portion of a body of revolution, the tooth flanks being shaped to correspond to the flank profile of the worm thread. An embodiment of such kind of steering gear is shown by Figures 5 and 6, in which the free end of the holder 30 forms the tooth 31. The holder 30 is embraced by the jacket 22 in such way that it can rotate and slide axially within the said jacket.

I claim:

1. In a steering device for motor vehicles the combination which comprises a steering spindle having a worm gear attached thereto, a steering arm and an engaging body carried by said arm, said engaging body being adapted to engage and cooperate with the worm to actuate the arm when the steering spindle and worm are rotated in steering the vehicle, means for rotatively mounting the engaging body adapted to hold the body so that it is free to slide along a line parallel to the longitudinal axis of the arm and to rotate about a line in a plane parallel to the axis of the steering spindle, spring means for urging said engaging body towards the worm and said mounting means being further adapted to limit movement of the spring means towards the engaging body whereby contact pressure between the engaging body and worm may be controlled and any shocks to the engaging body occurring during operation of the vehicle may be absorbed by the spring means.

2. A structure as specified in claim 1 in which the mounting means for the engaging body include a hollow cylindrical jacket rotatively mounted in the said arm and so arranged that it and the engaging body are free to rock about a line parallel to the axis of rotation of said arm.

3. In a steering device for motor vehicles, the combination which comprises a steering spindle having a worm gear attached thereto, a steering arm and an engaging body carried by said arm, said engaging body being adapted to engage and cooperate with the worm to actuate the arm when the steering spindle and worm are rotated in steering the vehicle, means for rotatively mounting the engaging body, said means being adapted to hold the engaging body so that it is free to slide along a line parallel to the longitudinal axis of the arm and to rotate about a line in a plane parallel to the axis of the steering spindle, spring means for urging said engaging body towards the worm, and means associated with said mounting means for limiting movement of the engaging body towards the worm whereby contact pressure between the engaging body and worm may be controlled and any shocks to the engaging body occurring during operation of the vehicle may be absorbed by the spring means.

4. In a steering device for motor vehicles, the combination which comprises a steering spindle having a worm gear attached thereto, a steering arm and an engaging body carried by said arm, said engaging body being adapted to engage and cooperate with the worm to actuate the arm when the steering spindle and worm are rotated in steering the vehicle, a holder for rotatively mounting the engaging body, a hollow cylindrical jacket for mounting the holder, means for slidably mounting the jacket in said arm so that the jacket and engaging body are free to slide along and to rock about a line parallel to the longitudinal axis of the arm and the engaging body is free to rotate about an axis in a plane parallel to the axis of rotation of said steering spindle, spring means for urging the holder and jacket towards the worm and said mounting means for the jacket being adapted to limit movement of the jacket towards the worm whereby contact pressure between the engaging body and worm may be controlled and any shocks on the engaging body during operation of the vehicle may be adsorbed by the spring means.

5. In a steering device for motor vehicles the combination which comprises a steering spindle having a worm gear attached thereto, a steering arm and an engaging body carried by said arm, said engaging body being adapted to engage and cooperate with the worm to actuate the arm when the steering spindle and worm are rotated in steering the vehicle, a hollow cylindrical jacket for mounting the engaging body, means within said jacket for rotatively mounting the engaging body so that the said body is free to rotate without contacting the jacket itself and means for mounting the jacket in said arm so that the engaging body is held in contact with the worm and is free to rotate about an axis in a plane parallel to the axis of rotation of said steering spindle.

6. In a steering device for motor vehicles the combination which comprises a steering spindle having a worm gear attached thereto, a steering arm and an engaging body carried by said arm, said engaging body being adapted to engage and cooperate with the worm to actuate the arm when the steering spindle and worm are rotated in steering the vehicle, a hollow cylindrical jacket for mounting the engaging body, means within said jacket for rotatively mounting the engaging body so that the said body is free to rotate without contacting the jacket itself and means for slidably mounting the jacket in said arm so that the jacket and engaging body are free to slide along and to rock about a line parallel to the longitudinal axis of the arm and the engaging body is free to rotate about an axis in a plane parallel to the axis of rotation of said steering spindle, and means for resiliently holding the engaging body in contact with the worm to give a rigid but resilient mounting for the engaging body.

7. Steering gear as claimed in claim 1, wherein said engaging body is so profiled with respect to said steering worm that over the entire arcuate path of movement of the steering arm head linear profile contact against the steering worm is maintained.

8. Steering gear as claimed in claim 1, wherein the depth of the thread of said steering worm is varied through the length of the worm while the effective flank profile is maintained uniform.

9. Steering gear as claimed in claim 1, wherein the thread of said steering worm is of varying pitch while the effective flank profile is maintained uniform.

10. Steering gear as claimed in claim 4, wherein said engaging body is constituted by a roller.

11. Steering gear as claimed in claim 4, wherein said engaging body is constituted by a toothlike member in the form of a segment-shaped cut-out portion of a profiled body of rotation, having tooth flanks shaped in accordance with the flank profile of the worm thread.

References Cited in the file of this patent

UNITED STATES PATENTS

| Number | Name | Date |
|---|---|---|
| 1,567,997 | Ross | Dec. 29, 1925 |
| 1,844,005 | Chandler | Feb. 9, 1932 |
| 2,036,780 | Robbins | July 13, 1937 |

FOREIGN PATENTS

| Number | Country | Date |
|---|---|---|
| 906,546 | France | May 22, 1945 |
| 699,530 | Germany | Dec. 2, 1940 |
| 253,257 | Great Britain | June 17, 1926 |
| 366,187 | Great Britain | Feb. 2, 1932 |